United States Patent
Wang (10) Patent No.: US 8,405,781 B2
(45) Date of Patent: Mar. 26, 2013

(54) ANALOG TELEVISION RECEIVER FOR PROCESSING INTERMEDIATE FREQUENCY TV SIGNAL

(75) Inventor: Fucheng Wang, Hsinchu Hsien (TW)

(73) Assignee: Mstar Semiconductor, Inc., Hsinchu Hsien (TW)

( * ) Notice: Subject to any disclaimer, the term of this patent is extended or adjusted under 35 U.S.C. 154(b) by 66 days.

(21) Appl. No.: 13/108,175

(22) Filed: May 16, 2011

(65) Prior Publication Data

US 2012/0105726 A1    May 3, 2012

(30) Foreign Application Priority Data

Nov. 2, 2010   (TW) ............................... 99137577 A (51) Int. Cl.
*H04N 5/455* (2006.01)
*H03M 1/12* (2006.01)

(52) U.S. Cl. ...................................... 348/726; 348/572

(58) Field of Classification Search .................. 348/572, 348/725, 726, 554, 555; 329/341–343; 455/313, 455/334

See application file for complete search history.

(56) References Cited

U.S. PATENT DOCUMENTS

| | | | |
|---|---|---|---|
| 2005/0031097 A1* | 2/2005 | Rabenko et al. | 379/93.31 |
| 2005/0266818 A1* | 12/2005 | Johnson et al. | 455/260 |
| 2008/0225182 A1* | 9/2008 | Silver et al. | 348/726 |
| 2010/0322326 A1* | 12/2010 | Arambepola et al. | 375/260 |

* cited by examiner

*Primary Examiner* — Victor Kostak
(74) *Attorney, Agent, or Firm* — WPAT PC; Justin King (57) ABSTRACT

An analog television (TV) receiver converts a received analog TV signal to a digital TV signal and performs digital demodulation to increase demodulation efficiency. The analog TV receiver includes a radio frequency (RF) turner and an intermediate frequency (IF) circuit. The RF tuner converts the received analog RF TV signal to an analog IF TV signal. The IF circuit includes a converting circuit and a digital demodulator. The converting circuit converts the analog IF TV signal to a digital TV signal. The digital demodulator demodulates the digital TV signal to generate a digital demodulated video signal and a digital demodulated audio signal.

16 Claims, 11 Drawing Sheets

ANALOG TELEVISION RECEIVER FOR PROCESSING INTERMEDIATE FREQUENCY TV SIGNAL

CROSS REFERENCE TO RELATED PATENT APPLICATION

This patent application is based on Taiwan, R.O.C. patent application No. 99137577 filed on Nov. 2, 2010.

FIELD OF THE INVENTION

The present invention relates to an analog television (TV), and more particularly, to an analog TV receiver.

BACKGROUND OF THE INVENTION

Figure 1:
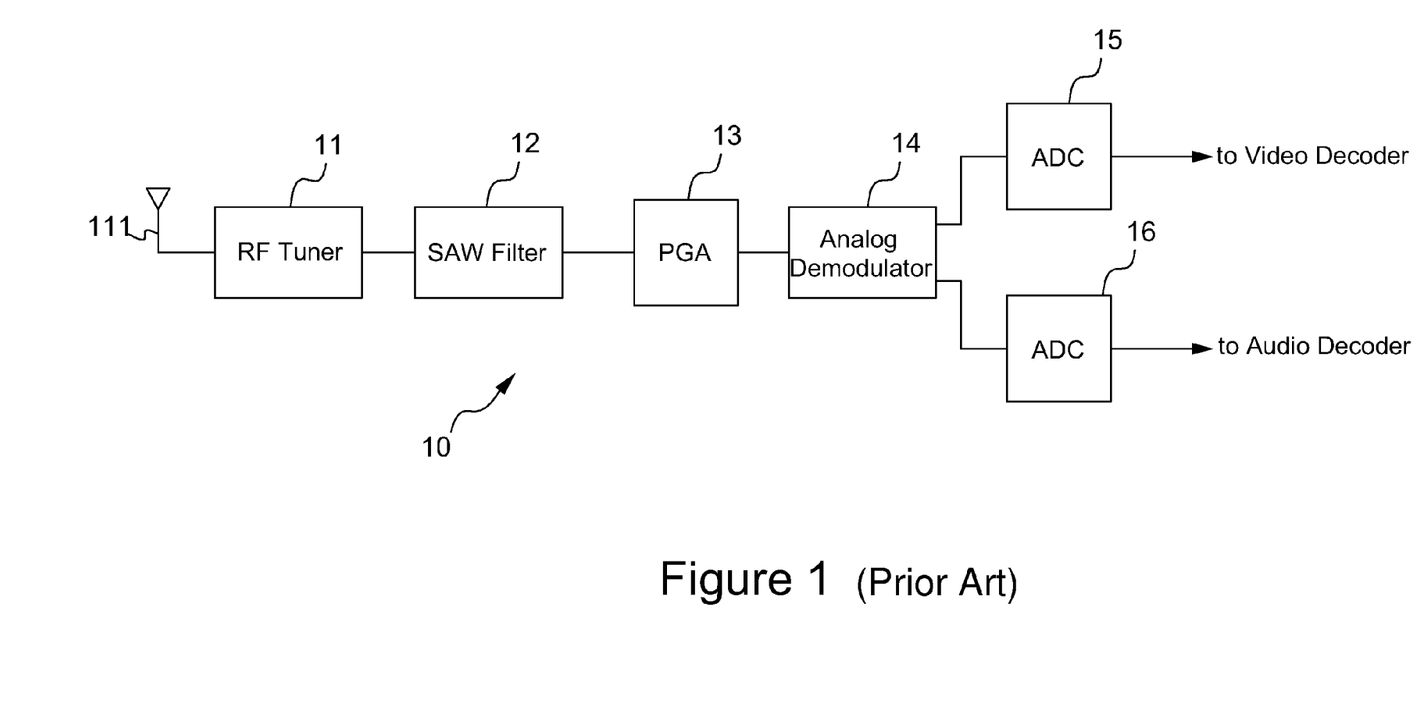
FIG. 1 is a block diagram of a conventional analog TV receiver.

A receiver is a crucial component in an analog TV system and environment. In the prior art, a receiver of an analog TV performs signal demodulation via an analog approach, and a typical hardware structure as illustrated in FIG. 1. An analog TV receiver 10 comprises a radio frequency (RF) tuner 11, a surface audio wave (SAW) filtering circuit 12, a programmable gain amplifier (PGA) 13, an analog demodulator 14, and analog-to-digital converters (ADCs) 15 and 16 for sending signals to other components, such as decoders. The RF tuner 11 converts an analog RF TV signal received by an antenna 111 to an analog IF TV signal. The SAW filtering circuit 12 filters out noises of the analog IF TV signal. The PGA 13 amplifies the noises-removed analog IFTV signal to a desired intensity. The analog demodulator 14 demodulates the amplified analog IF TV signal to generate an analog composite video broadcast signal (CVBS) and a sound intermediate frequency (SIF) signal, which are respectively converted by the ADCs 15 and 16 to digital signals to be respectively transmitted to a video decoder and an audio decoder for subsequent digital signal processing or rendering. However, the effect of analog demodulation is not always ideal, and may seriously affect quality of a TV signal. Therefore, there is a need in the art to increase demodulation efficiency and improve the generation of digital TV signals.

SUMMARY OF THE INVENTION

In view of the foregoing issues, one object of the present invention is to provide an analog TV receiver capable of converting a received analog TV signal to a digital TV signal and performing digital demodulation thereby increasing demodulation efficiency.

According to an embodiment of the present invention, an analog receiver comprises an RF tuner, for converting a received analog RF TV signal to an IF TV signal; and an IF circuit. The IF circuit comprises a converting circuit, coupled to the RF tuner, for converting the analog IF TV signal to a digital TV signal; and a digital demodulator, coupled to the converting circuit, for demodulating the digital TV signal to generate a digital demodulated video signal and a digital demodulated video signal.

DETAILED DESCRIPTION OF THE PREFERRED EMBODIMENT

Figure 2:
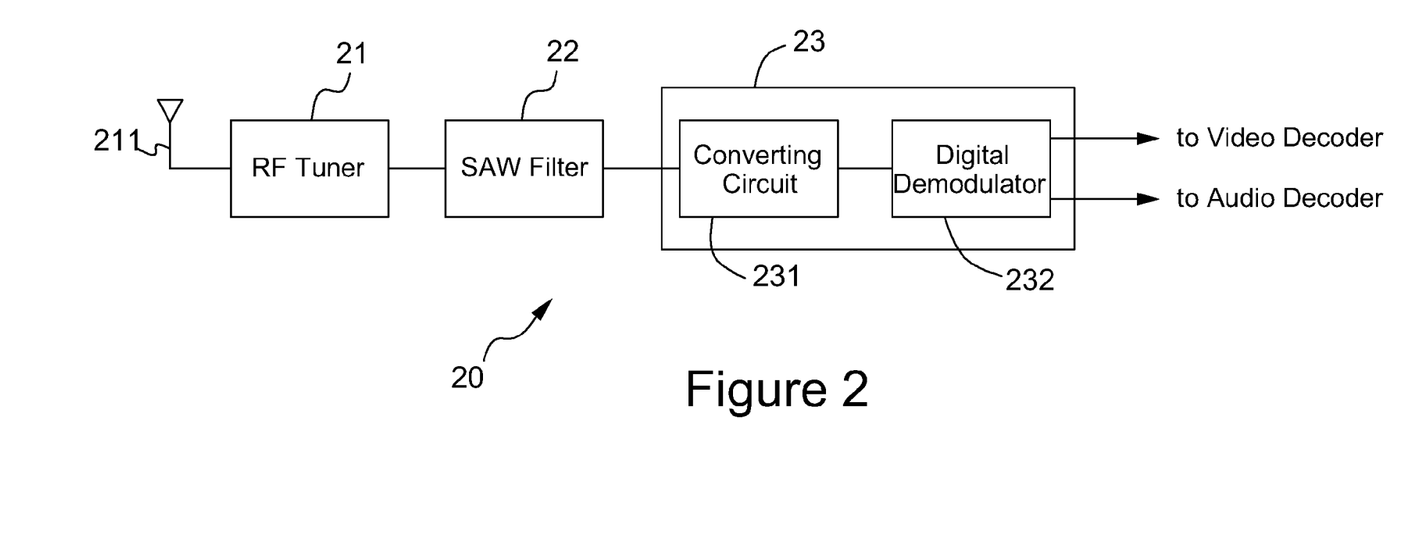
FIG. 2 is a block diagram of an analog TV receiver in accordance with an embodiment of the present invention.

FIG. 2 is a block diagram of an analog TV receiver in accordance with an embodiment of the present invention. An analog TV receiver 20 comprises an RF turner 21, a SAW filtering circuit 22, and an IF circuit 23. The RF tuner 21 converts an analog RF TV signal received by the antenna 211 to an analog IF TV signal. The SAW filtering circuit 22 coupled to the RF turner 21 filters out noises of the analog IF TV signal. The IF circuit 23 comprises a converting circuit 231 and a digital demodulator 232. The converting circuit 231, coupled between the SAW filtering circuit 22 and the digital demodulator 232, converts the noise-removed analog IF TV signal to a digital TV signal. The digital demodulator 232 demodulates the digital TV signal to generate a digital demodulated video signal and a digital demodulated audio signal that are respectively transmitted to a video decoder and an audio decoder for subsequent digital signal processing. The digital demodulated video signal is a CVBS, and the digital demodulated audio signal is a digital SIF signal, as examples.

Figure 3:
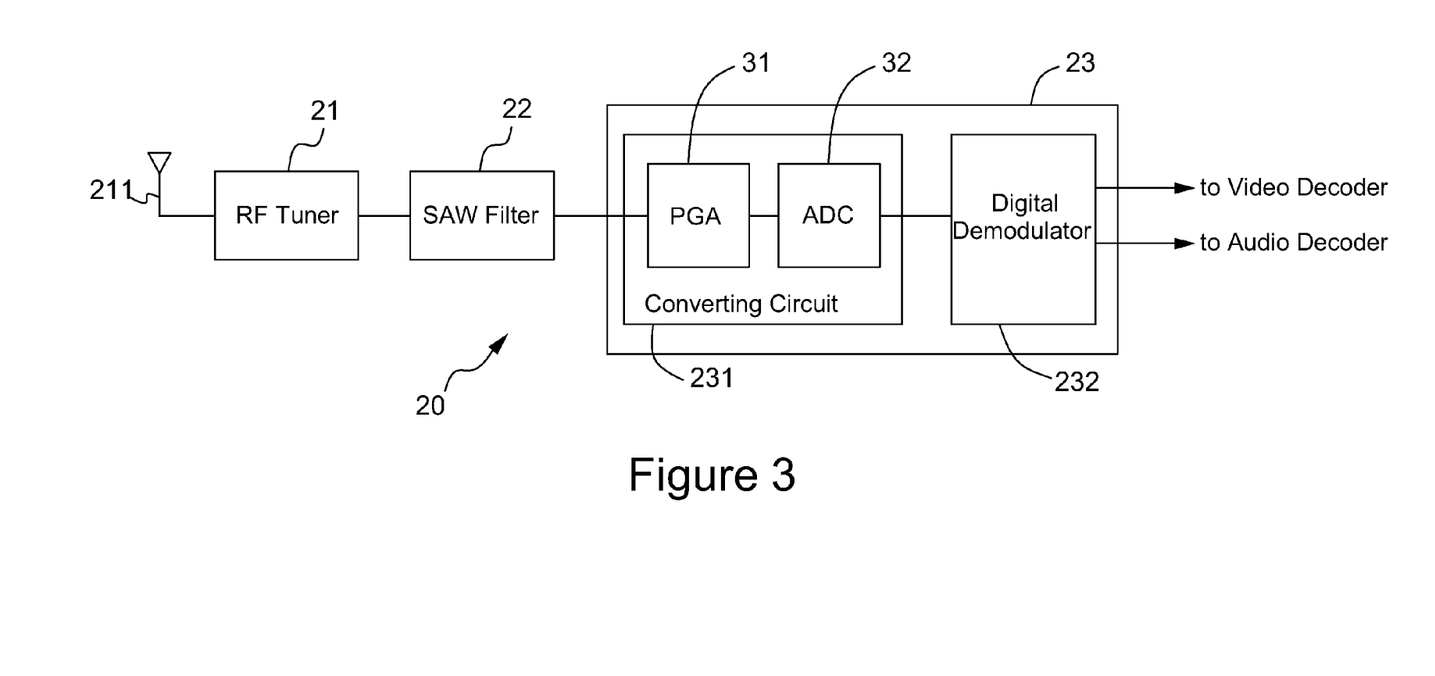
FIG. 3 is a block diagram of an analog TV receiver in accordance with a first embodiment of the present invention.

Various types of analog TV receivers represented by the block diagram illustrated in FIG. 2 are described below. A main difference among differing analog TV receivers is that the converting circuits 231 of these analog TV receivers in the present invention are different. FIG. 3 is a block diagram of the analog TV receiver 20 in accordance with a first embodiment of the present invention. The converting circuit 231 comprises a PGA 31 and an ADC 32. The PGA 31 coupled to the SAW filtering circuit 22 amplifies the noise-removed analog IF TV signal to a desired signal intensity, e.g., a maximum signal intensity matching with a dynamic range of the ADC 32. Typically, the PGA 31 comprises more than one stage of amplifier to achieve a better amplifying effect. The ADC 32 coupled to the PGA 31 converts the amplified analog IF TV signal to a digital IF TV signal that is transmitted to the digital demodulator 232 for demodulation. Therefore, in the first embodiment, the digital TV signal outputted by the converting circuit 231 is the digital IF TV signal.

Figure 4:
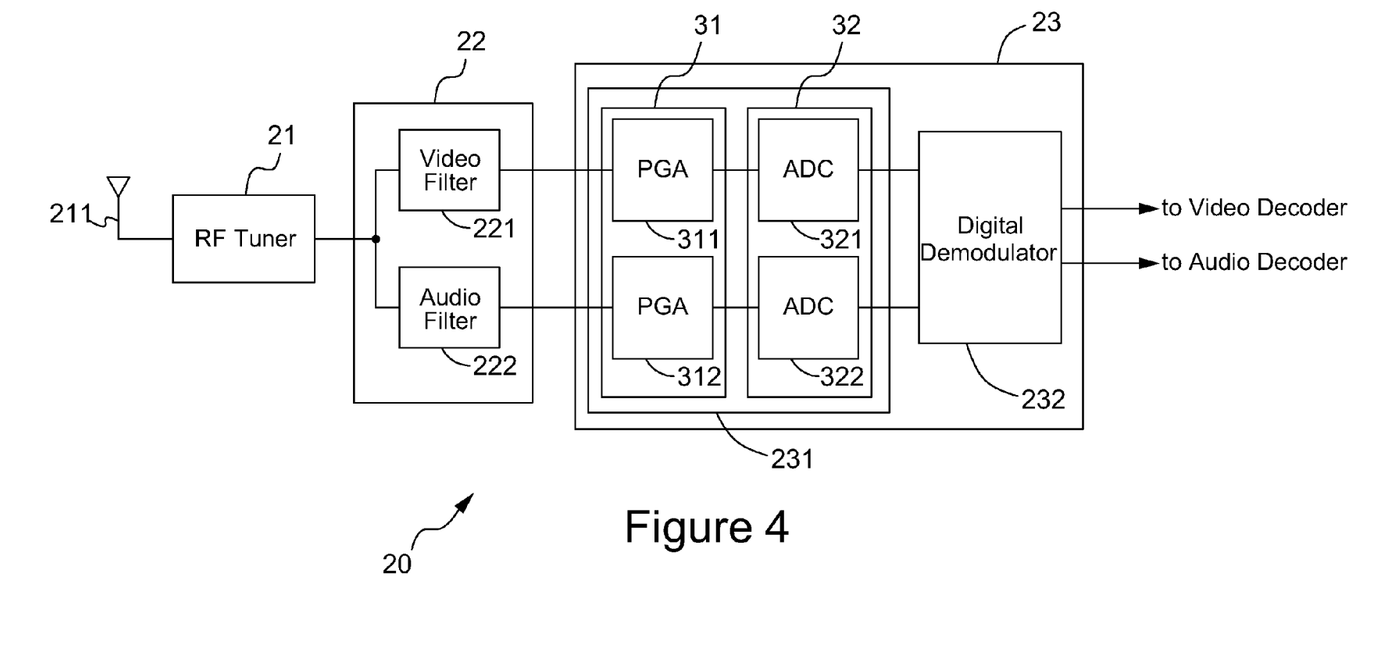
FIG. 4 is a block diagram of an arrangement for separating signal paths of a video part and an audio part in accordance with the first embodiment illustrated in FIG. 3.

In the first embodiment, the SAW filtering circuit 22 respectively filters out and transmits the video part and the audio part of the analog IF TV signal to the IF circuit 23 for processing as illustrated in FIG. 4. The SAW filtering circuit 22 comprises a video filter 221, for filtering out an analog IF video signal from the analog IF TV signal; and an audio filter 222, for filtering out an analog IF audio signal from the analog IF TV signal. The PGA 31 comprises PGA units 311 and 312, and the ADC 32 comprises ADC units 321 and 322. The PGA unit 311 and the ADC unit 321 form a video signal path for converting the analog IF video signal to a digital IF video signal. The PGA unit 312 and the ADC unit 322 form an audio signal path for converting the analog IF audio signal to a digital IF audio signal. Accordingly, cross talk between the video signal path and the audio signal path is reduced by separating signal paths of the video part and the audio part. The digital TV signal outputted by the converting circuit 231 as illustrated in FIG. 4 comprises the digital IF video signal and the digital IF audio signal which are output to digital demodulator 232.

Figure 5:
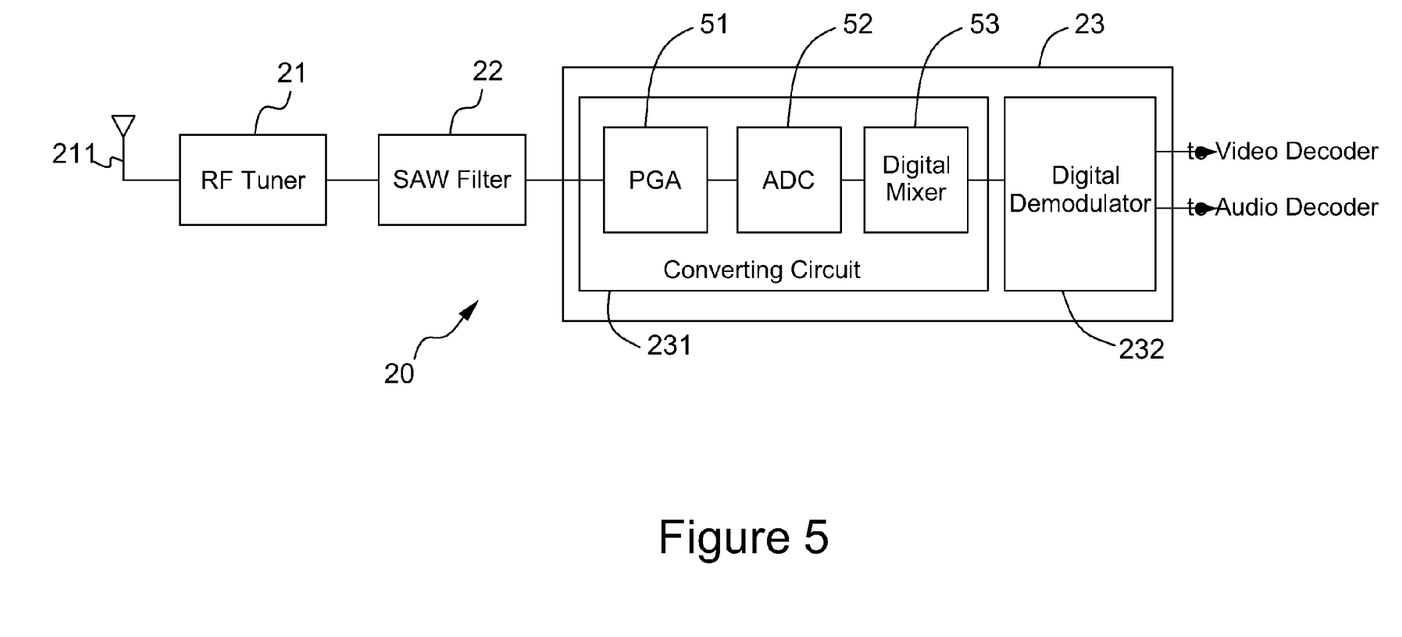
FIG. 5 is a block diagram of an analog TV receiver in accordance with a second embodiment of the present invention.

FIG. 5 is a block diagram of the analog TV receiver 20 in accordance with a second embodiment of the present invention. The converting circuit 231 comprises a PGA 51, an ADC 52, and a digital mixer 53. Functions of the PGA 51 and the ADC 52 are similar to those of the PGA 31 and the ADC 32 in the first embodiment, and shall not be described for brevity. The digital mixer 53 performs frequency conversion to convert a digital IF TV signal outputted by the ADC 52 to a digital baseband TV signal that is transmitted to the digital demodulator 232 for demodulation. Therefore, in the second embodiment, the digital TV signal outputted by the converting circuit 231 is a digital baseband TV signal.

Figure 6:
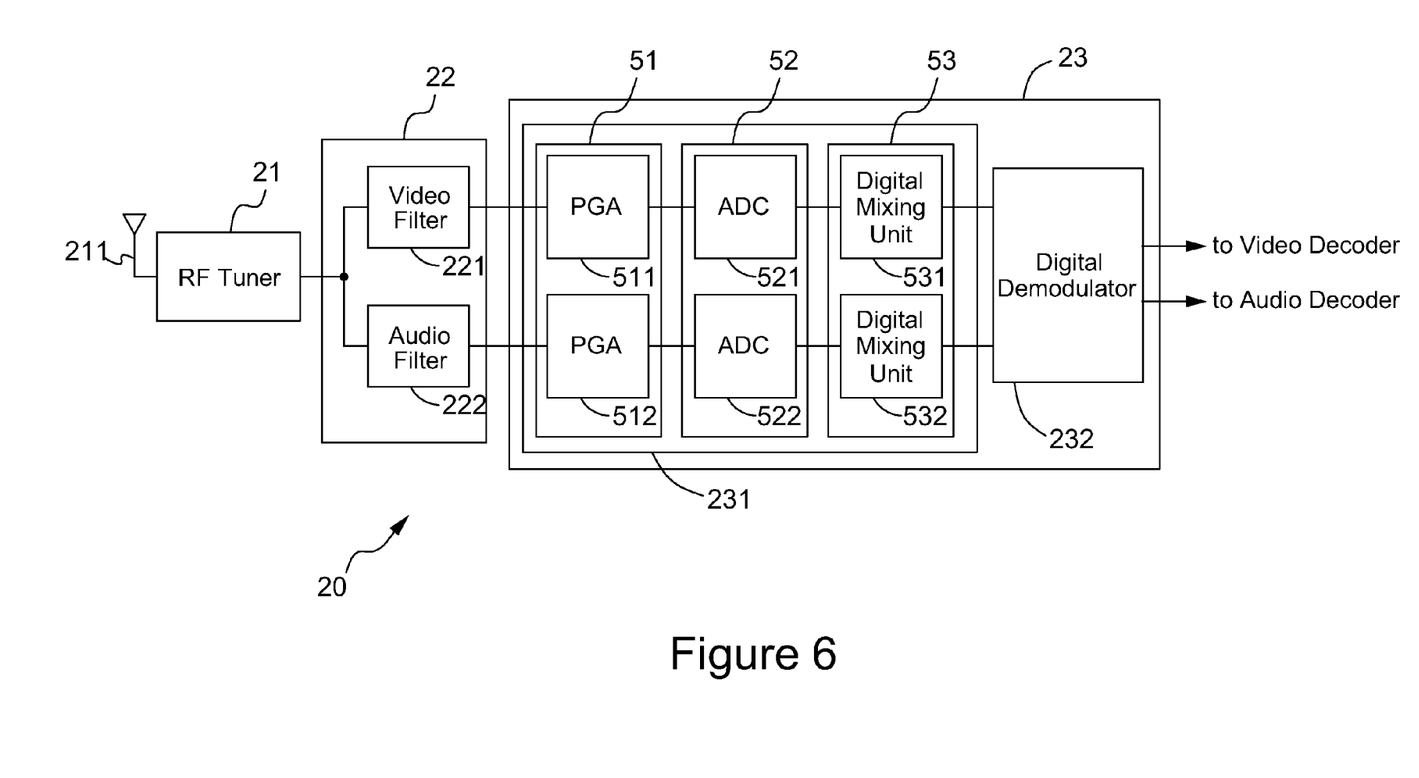
FIG. 6 is a block diagram of an arrangement for separating signal paths of a video part and an audio part in accordance with the second embodiment illustrated in FIG. 5.

Similar to the first embodiment, in the second embodiment, the SAW filtering circuit 22 respectively filters out and transmits the video part and the audio part of the analog IF TV signal to the IF circuit 23 for processing. Referring to FIG. 6, the PGA 51 comprises PGA units 511 and 512, the ADC 52 comprises ADC units 521 and 522, and the digital mixer 53 comprises digital mixing units 531 and 532. The PGA unit 511, the ADC unit 521, and the digital mixing unit 531 form a video signal path for converting the analog IF video signal outputted by the video filter 221 to a digital baseband video signal. The PGA unit 512, the ADC unit 522, and the mixing unit 532 form an audio signal path for converting the analog IF audio signal outputted by the audio filter 222 to a digital baseband audio signal. Accordingly, cross talk between the video signal path and the audio signal path is reduced by separating the two paths. Therefore, the digital TV signal outputted by the converting circuit 231 as illustrated in FIG. 6 comprises the digital baseband video signal and the digital baseband audio signal.

Preferably, in the first and second embodiments, the ADCs 32 and 52 perform analog-to-digital conversion via over-sampling, which means that an implemented sampling frequency is larger than a Nyquist rate (i.e., twice a highest frequency of a to-be-sampled signal) to avoid damage of sampling quality caused by self-aliasing effects. In the first and second embodiment, since the ADCs 32 and 52 sample the IF TV signal, a sampling frequency for performing over-sampling needs to be higher than twice a highest frequency of the IF TV signal. IF signal bandwidths matching with main analog TV specifications are listed below, e.g., 41 to 47 MHz in the NTSC specification and 32 to 40 MHz in the PAL and SECAM specifications. In addition, different from IF signal bandwidths adopted in other areas, the IF signal bandwidth defined in the NTSC specification adopted by Japan is 54 to 60 MHz. In conclusion, the most probable highest IF frequency is 60 MHz, and when the ADCs 32 and 52 are designed to perform over-sampling and are applicable to the foregoing types of specifications, the sampling frequency needs to be higher than twice 60 MHz, i.e., 120 MHz.

Figure 7:
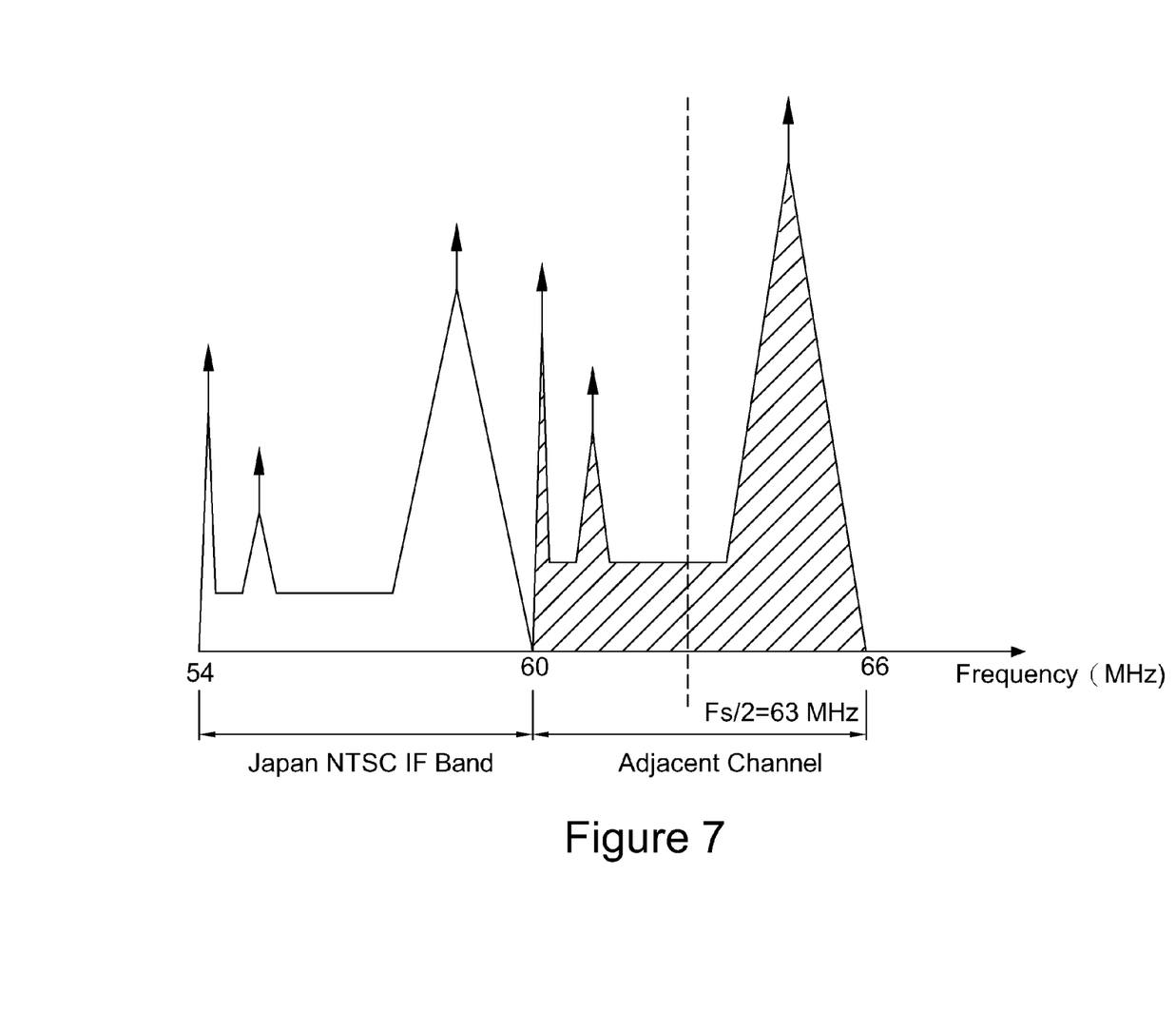
FIG. 7 is a schematic diagram for illustrating adjacent channel interferences using the Japanese National Television System Committee (NTSC) specification as an example.

In the present invention, it is a key issue to select a sampling frequency for the ADCs 32 and 52. The sampling frequency for the ADCs 32 and 52 are determined according to the highest frequency of the IF TV signals, the adjacent channel interference (ACI), and the oscillator frequency used in the analog TV receiver 20. Due to over-sampling considerations, the sampling frequency is designed to be higher than twice highest frequency of the IF TV signals of NTSC, PAL and SECAM TV specifications. The adjacent channel interference occurs if the sampling frequency is not high enough, where signals in adjacent channels are overlapped with an occupied bandwidth due to self-aliasing. When self-aliasing occurs, components of the to-be-sampled signal at frequencies higher than a folding frequency (i.e., half of the sampling frequency) are symmetrically folded back to frequencies lower than the folding frequency by regarding the folding frequency as a center of the spectrum. That is, when the sampling frequency is Fs, the folding frequency is Fs/2, and any frequency f higher than Fs/2 is folded back to a frequency Fs−f (Fs−f=Fs/2−(f−Fs/2)). FIG. 7 is a schematic diagram of the occurrence of adjacent channel interferences using the Japanese National Television System Committee (NTSC) specification as an example. In this example, 54 to 60 MHz is the frequency band of IF TV signal defined in the Japanese NTSC specification, and 60 to 66 MHz is the frequency band of an adjacent channel. When the sampling frequency Fs is 126 MHz, the folding frequency Fs/2 is 63 MHz, and at this point, the highest frequency 66 MHz in the adjacent channels is folded back to 60 MHz (60=126−66). In other words, when the sampling frequency is lower than 126 MHz, the highest frequency 66 MHz in adjacent channels is overlapped with the frequency band 54 to 60 MHz and thereby affects the quality of the IF TV signal. Therefore, the sampling frequency needs to be higher than or equal to 126 MHz to avoid adjacent channel interference. For other types of TV specifications other than the Japanese NTSC specification, the foregoing approach is also implemented to select an appropriate sampling frequency to avoid the adjacent channel interference. However, since the current highest IF frequency of all TV specifications is the frequency band 54 to 60 MHz used in the Japanese NTSC specification, the sampling frequency higher than or equal to 126 MHz meets the requirement of all TV specifications.

Figure 8A:
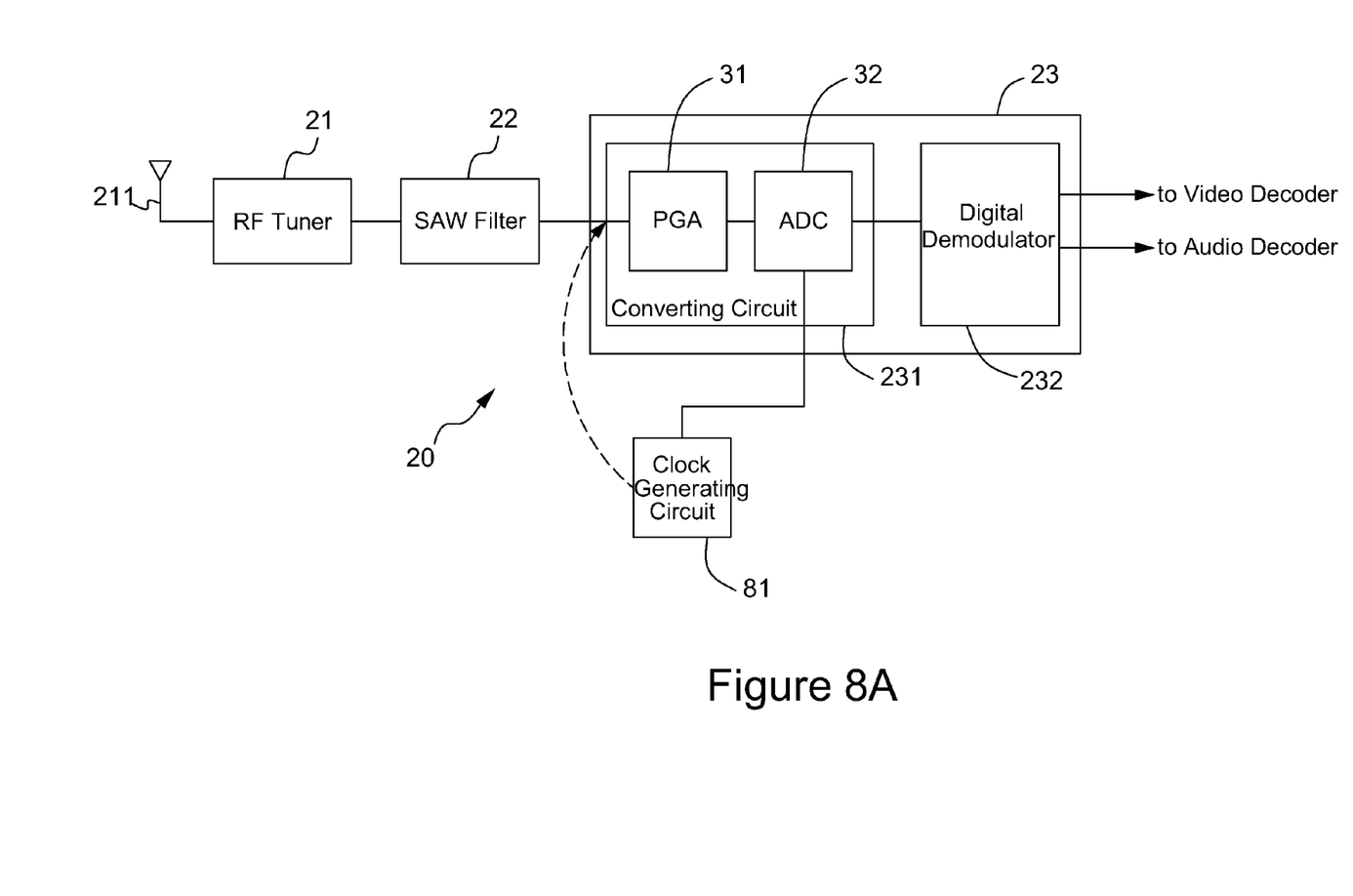
FIG. 8A is a block diagram of a clock generating circuit and the analog TV receiver illustrated in FIG. 3 in accordance with the first embodiment of the present invention.

Influences of the oscillation frequency mean that, harmonics of an oscillation frequency (for synthesizing a desired sampling clock signal of the ADCs 32 and 52) adopted by the analog TV receiver 20 directly lie within the IF signal bandwidth, or are overlapped with the IF signal bandwidth during sampling due to self-aliasing, thereby undesirably affecting TV signal quality. FIG. 8A is a schematic diagram of a clock generating circuit and the analog TV receiver illustrated in FIG. 3 in accordance with an embodiment of the present invention. A clock generating circuit 81 generates a sampling clock signal according to an oscillation frequency, and transmits the sampling clock signal to the ADC 32. The clock generating circuit 81 comprises an oscillator and a frequency synthesizer (not shown). The oscillator generates an oscillation clock signal, and the frequency synthesizer synthesizes the sampling clock signal according to the oscillation clock signal. Since the oscillation clock signal is fed to an input end of the converting circuit 231 and is transmitted together with the analog IF TV signal to the ADC 32, the oscillation clock signal and its harmonics directly lie within the IF TV signal bandwidth, or the oscillation clock signal is overlapped with the IF TV signal bandwidth due to self-aliasing in the sampling procedure. It is to be noted that, even if a clock generating circuit 81 is added to the analog TV receiver in accordance with the second embodiment of the present invention, the foregoing problem is still generated.

Figure 8B:
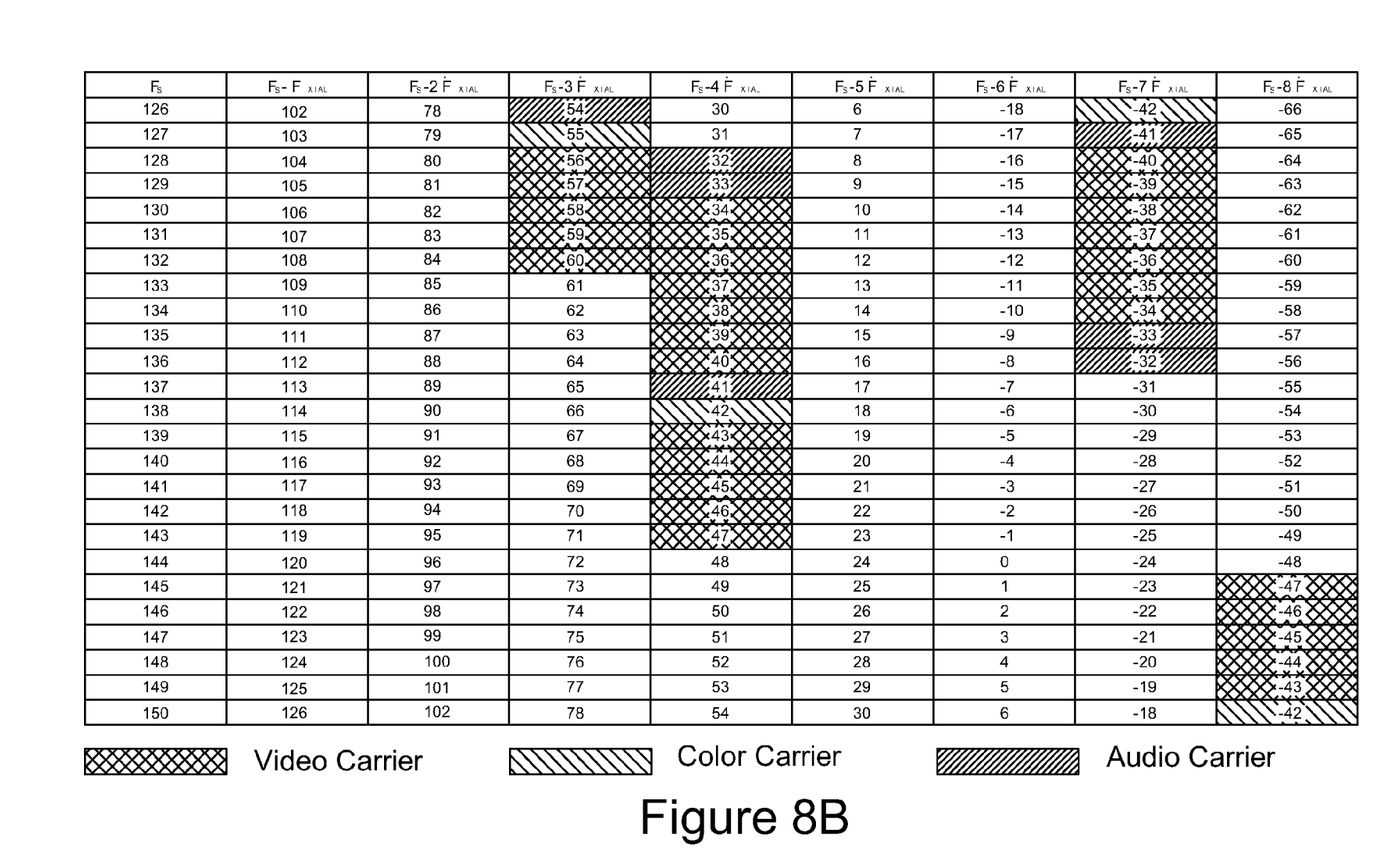
FIG. 8B is a schematic diagram for illustrating interference between different sampling frequencies and IF signal bandwidths of the main TV specifications.

In order to avoid the undesired influences caused by the oscillation frequency, for selection of the oscillation frequency and the sampling frequency, the clock signal generated by the oscillator and its harmonics need not directly lie within the IF TV signal bandwidth or be overlapped with the IF TV signal bandwidth after sampling. For the oscillation frequency, when a single oscillation frequency is applicable to an overall TV apparatus (i.e., comprising an I/O interface, a tuner, a demodulator, a decoder, USB interface and so forth), the cost of the TV apparatus is reduced. In this embodiment, the frequency 24 MHz is selected as an oscillation frequency of a single oscillator (not shown) of the analog TV receiver 20. A multiple of the frequency 24 MHz is an operating frequency of the USB interface, and the frequency 24 MHz and its multiples (e.g., 48 MHz, 72 MHz) do not lie within the IF signal bands defined in the main TV specifications, e.g., 32 to 40 MHz, 41 to 47 MHz, and 54 to 60 MHz. For selection of the sampling frequency, 24 MHz and its multiples need not be overlapped with the IF signal bands defined in the main TV specifications as illustrated in FIG. 8B. In the description of FIG. 8B, the diagram shows the sampling frequency selected between 126 MHz and 150 MHz. One reason for using this interval is that the sampling frequency needs to be higher than or equal to 126 MHz to avoid the abovementioned adjacent channel interference. Another reason for selecting this interval includes the significant increase of sampling circuit design complexity if the sampling frequency is higher than 150 MHz. Seen from FIG. 8B, when the sampling frequency Fs is selected as 126 MHz, a triple of (i.e., a third harmonic) the oscillation frequency $F_{XTAL}$ (24 MHz) is overlapped to 54 MHz (126−3*24), i.e., it lies within the band 54 to 60 MHz. Seven times the oscillation frequency $F_{XTAL}$ (24 MHz) is shown overlapped to −42 MHz (126−7*24), i.e., it lies within the negative band 41 MHz to 47 MHz. In the IF signal bands defined in main TV specifications, a video carrier, an audio carrier, and a color carrier are located at different frequencies. In a band 32 MHz to 40 MHz, the video carrier, the audio carrier and the color carrier are respectively located at 38~39 MHz, 32~33 MHz, and 33~35 MHz. In a band 41 to 47 MHz, the video carrier, the audio carrier, and the color carrier are respectively located at about 45 MHz, 41 MHz, and 42 MHz. In a band 54 MHz to 60 MHz, the video carrier, the audio carrier and the color carrier are respectively located at about 58 MHz, 54 MHz, and 55 MHz (the frequencies of the carriers are slightly different under different specifications or different versions of one specification). Therefore, for the foregoing sampling frequency Fs of 126 MHz, triple the oscillation frequency $F_{XTAL}$ is overlapped with the audio carrier within the band 54 MHz to 60 MHz, and seven times the oscillation frequency $F_{XTAL}$ is overlapped with the negative color carrier within the band 41 MHz to 47 MHz. Other sampling frequencies may also be identically analyzed.

When the harmonics of the oscillation frequency are overlapped with different carriers due to self-aliasing, influences on the TV signal are different. For example, the influence on the TV signal when the color carrier is overlapped is smaller than that on the TV signal when the audio carrier is overlapped, and the influence on the TV signal when the audio carrier is overlapped is smaller than that on the TV signal when the video carrier is overlapped. Referring to FIG. 8B, components overlapped with different carriers are displayed using different approaches. During the possible sampling frequency range between 126 MHz and 150 MHz, it is analyzed whether the first harmonic to the eighth harmonic (the harmonics higher than the eighth harmonic are too small to be ignored) of the oscillation frequency 24 MHz are overlapped with any IF TV signal. The result is that frequency 144 MHz is not overlapped with any IF TV signal and so, this frequency is the best selection as a sampling frequency. Other selections are sampling frequencies that are overlapped with the audio carrier or the color carrier, causing only slight influence on the TV signal, e.g., 126 MHz, 127 MHz, 137 MHz, 138 MHz, and 150 MHz. It is to be noted that, the foregoing analyzing approach could be used to select an oscillation frequency and a different sampling frequency for other IF TV signal bands in different TV specifications.

Figure 9A:
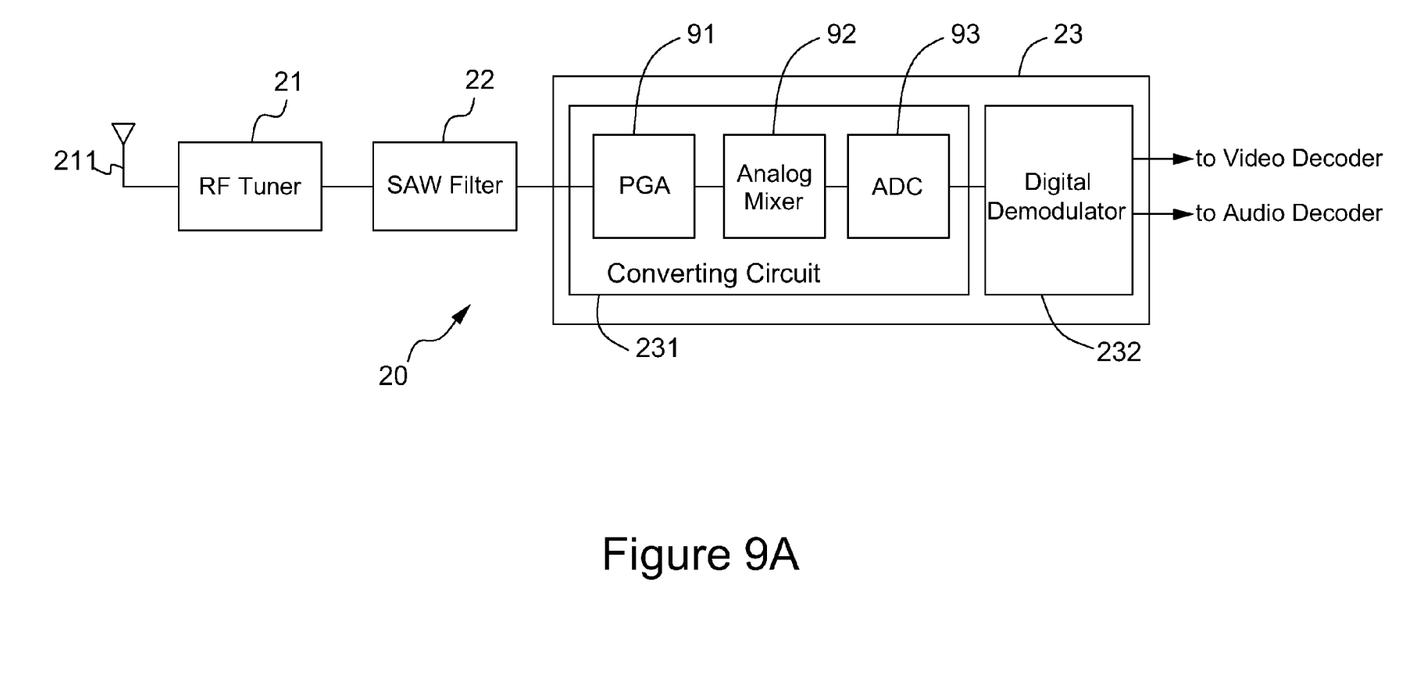
FIG. 9A is a block diagram of an analog TV receiver in accordance with a third embodiment of the present invention.
Figure 9B:
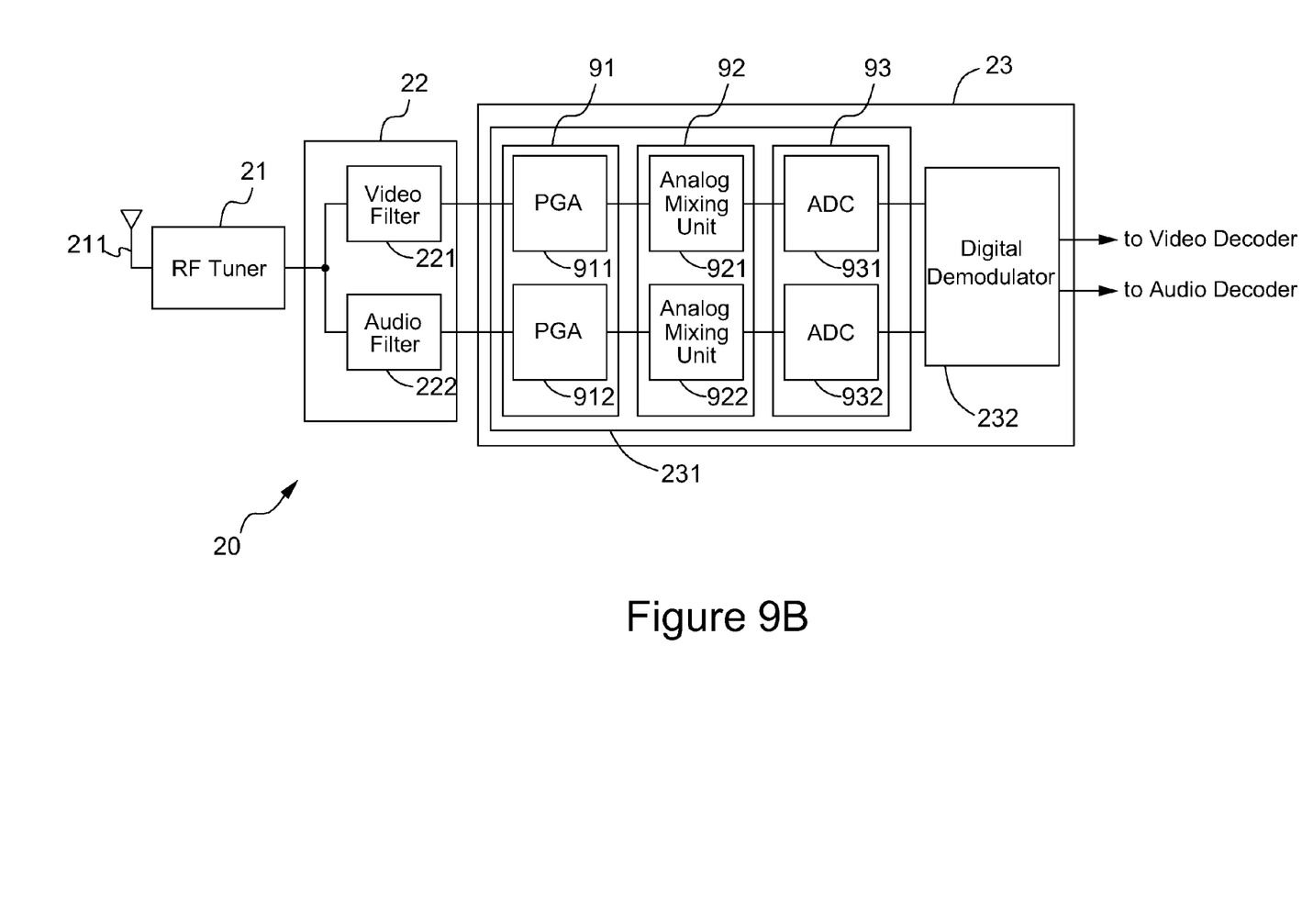
FIG. 9B is a block diagram of an arrangement for separating signal paths of a video part and an audio part in accordance with the third embodiment of the present invention.

FIG. 9A is a block diagram of the analog TV receiver 20 in accordance with a third embodiment of the present invention. The converting circuit 231 comprises a PGA 91, an analog mixer 92, and an ADC 93. A major difference between the third embodiment and the prior second embodiment is that, an analog IF TV signal is first frequency-converted and is then analog-to-digitally converted in the third embodiment, i.e., upon being amplified by the PGA 91, the analog IF TV signal is converted via the analog mixer 92 to an analog baseband TV signal that is transmitted to the ADC 93 and is then converted to a digital baseband TV signal. Similar to the first and second embodiments, in the third embodiment, the video part and the audio part of the analog IF TV signal are respectively filtered out via the SAW filtering circuit 22, and are then transmitted to the IF circuit 23 for processing. Referring to FIG. 9B, the PGA 91 comprises PGA units 911 and 912, and the analog mixer 92 comprises analog mixer units 921 and 922, and the ADC 93 comprises ADC units 931 and 932. The PGA unit 911, the analog mixer 921, and the ADC 931 form a video signal path for converting the analog IF video signal outputted by the video filter 221 to a digital baseband video signal. The PGA unit 912, the analog mixer unit 922, and the ADC 932 form an audio signal path for converting the analog IF audio signal outputted by the audio filter 222 to a digital baseband audio signal. Therefore, referring to FIG. 9B, the digital TV signal outputted by the converting circuit 231 comprises the digital baseband video signal and the digital baseband audio signal.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An analog television (TV) receiver, comprising:
   a radio frequency (RF) tuner, for converting a received analog RF TV signal to an analog intermediate frequency (IF) TV signal;
   a single frequency oscillator, for providing an oscillation frequency to an analog-to-digital converter (ADC) and a USB interface, wherein the oscillation frequency and its harmonics are located outside a plurality of IF signal bands defined in TV specifications; and
   an IF circuit, comprising:
      a converting circuit, coupled to the RF tuner, comprising the ADC for converting the analog IF TV signal to a digital IF TV signal; and
      a digital demodulator, coupled to the converting circuit, for demodulating the digital IF TV signal to generate a digital demodulated video signal and a digital demodulated audio signal.

2. The analog TV receiver as claimed in claim 1, wherein the converting circuit further comprises:
a programmable gain amplifier (PGA), for amplifying the analog IF TV signal before the analog IF TV signal is transmitted to the ADC.

3. The analog TV receiver as claimed in claim 1, wherein the ADC performs analog-to-digital conversion via oversampling.

4. The analog TV receiver as claimed in claim 3, further comprising:
a clock generating circuit, for generating a sampling clock signal according to an oscillation frequency that is transmitted to the ADC, wherein the frequency of the sampling clock signal is higher than at least twice of the highest frequency of a plurality of IF signal frequencies defined in TV specifications.

5. The analog TV receiver as claimed in claim 4, wherein the oscillation frequency is 24 MHz, and the frequency of the sampling clock signal is 144 MHz.

6. The analog TV receiver as claimed in claim 1, further comprising:
a surface audio wave (SAW), coupled between the RF tuner and the converting circuit, for filtering noises of the analog IF TV signal.

7. The analog TV receiver as claimed in claim 6, wherein the SAW filtering circuit comprises:
a video filter, for filtering out an analog IF video signal from the analog IF TV signal; and
an audio filter, for filtering out an analog IF audio signal from the analog IF TV signal.

8. The analog TV receiver as claimed in claim 7, wherein the converting circuit converts the analog IF video signal to a digital video signal of the digital TV signal, and converts the analog IF audio signal to a digital audio signal of the digital TV signal.

9. An analog television (TV) receiver, comprising:
a radio frequency (RF) tuner, for converting a received analog RF TV signal to an analog intermediate frequency (IF) TV signal;
a single frequency oscillator, for providing an oscillation frequency to an analog-to-digital converter (ADC) and a USB interface, wherein the oscillation frequency and its harmonics are located outside a plurality of IF signal bands defined in TV specifications; and
an IF circuit, comprising:
a converting circuit, coupled to the RF tuner, comprises:
the ADC for converting the analog IF TV signal to a digital baseband TV signal; and
a digital mixer, coupled to the ADC; for converting the digital IF TV signal to the digital baseband TV signal; and
a digital demodulator, coupled to the converting circuit, for demodulating the digital baseband TV signal to generate a digital demodulated video signal and a digital demodulated audio signal.

10. The analog TV receiver as claimed in claim 9, wherein the converting circuit further comprises:
a programmable gain amplifier (PGA), for amplifying the analog IF TV signal before the analog IF TV signal is transmitted to the ADC.

11. The analog TV receiver as claimed in claim 9, wherein the ADC performs analog-to-digital conversion via oversampling.

12. The analog TV receiver as claimed in claim 11, further comprising:
a clock generating circuit, for generating a sampling clock signal according to an oscillation frequency that is transmitted to the ADC, wherein the frequency of the sampling clock signal is higher than at least twice of the highest frequency of a plurality of IF signal frequencies defined in TV specifications.

13. The analog TV receiver as claimed in claim 12, wherein the oscillation frequency is 24 MHz, and the frequency of the sampling clock signal is 144 MHz.

14. An analog television (TV) receiver, comprising:
a radio frequency (RF) tuner, for converting a received analog RF TV signal to an analog intermediate frequency (IF) TV signal;
a surface audio wave filter, coupled to the RF tuner, for filtering noises of the analog IF TV signal;
a single frequency oscillator, for providing an oscillation frequency to an analog to digital converter (ADC) and a USB interface, wherein the oscillation frequency and its harmonics are located outside a plurality of IF signal bands defined in TV specifications; and
an IF circuit, comprising:
a converting circuit, coupled to the surface audio wave filter, for converting the analog IF TV signal to a digital TV signal, comprising:
a programmable gain amplifier (PGA) coupled to the surface audio wave filter, for amplifying the analog IF TV signal; and
the ADC coupled to the programmable gain amplifier, for converting the IF TV signal to the digital IF TV signal; and
a digital demodulator, coupled to the converting circuit, for demodulating the digital TV signal to generate a digital demodulated video signal and a digital demodulated audio signal.

15. The analog TV receiver as claimed in claim 14, further comprising:
a clock generating circuit coupled to an input end of the converting circuit, for generating a sampling clock signal according to an oscillation frequency that is transmitted to the ADC together with the analog IF TV signal, wherein the frequency of the sampling clock signal is higher than at least twice of the highest frequency of a plurality of IF signal frequencies defined in TV specifications.

16. The analog TV receiver as claimed in claim 15, wherein the SAW filtering circuit further comprises:
a video filter, for filtering out an analog IF video signal from the analog IF TV signal; and
an audio filter, for filtering out an analog IF audio signal from the analog IF TV signal.

* * * * *